United States Patent
Lopez-Perez et al.

(10) Patent No.: US 10,039,130 B2
(45) Date of Patent: Jul. 31, 2018

(54) COMMUNICATIONS NETWORK, MACRO CELL, SMALL CELL, COMMUNICATIONS SYSTEM AND COMMUNICATIONS METHOD

(71) Applicant: Alcatel Lucent, Boulogne Billancourt (FR)

(72) Inventors: David Lopez-Perez, Blanchardstown (IE); Stepan Kucera, Blanchardstown (IE); Vijay Venkateswaran, Blanchardstown (IE)

(73) Assignee: Alcatel Lucent, Boulogne-Billancourt (FR)

( * ) Notice: Subject to any disclaimer, the term of this patent is extended or adjusted under 35 U.S.C. 154(b) by 123 days.

(21) Appl. No.: 15/029,382

(22) PCT Filed: Sep. 17, 2014

(86) PCT No.: PCT/EP2014/002505
§ 371 (c)(1),
(2) Date: Apr. 14, 2016

(87) PCT Pub. No.: WO2015/055271
PCT Pub. Date: Apr. 23, 2015

(65) Prior Publication Data
US 2016/0278129 A1    Sep. 22, 2016

(30) Foreign Application Priority Data
Oct. 16, 2013   (EP) ..................................... 13290285

(51) Int. Cl.
*H04W 36/30*   (2009.01)
*H04W 74/08*   (2009.01)
(Continued)

(52) U.S. Cl.
CPC ........... *H04W 74/0833* (2013.01); *H04L 1/02* (2013.01); *H04L 5/0048* (2013.01);
(Continued)

(58) Field of Classification Search
CPC ......... H04W 74/0833; H04W 36/0094; H04W 72/044; H04W 52/0206; H04W 36/0055;
(Continued)

(56) References Cited

U.S. PATENT DOCUMENTS 9,497,650 B2 * 11/2016 Nagata .................. H04L 5/0057
9,622,170 B2 *  4/2017 Zhu .................... H04W 52/0206
(Continued)

FOREIGN PATENT DOCUMENTS

EP        2 603 038 A1     6/2013
WO   WO 2011/072726 A1    6/2011

OTHER PUBLICATIONS

Research in Motion et al., "Further Discussion on PRACH Enhancement for CoMP Scenario 4," 3$^{rd}$ Generation Partnership Project (3GPP), 3GPP TSG RAN WG1 Meeting #66bis, R1-113235, pp. 1-5, XP050538351, Zhuhai, Oct. 10-14, 2011.
(Continued)

*Primary Examiner* — Phuc Tran
(74) *Attorney, Agent, or Firm* — Fay Sharpe, LLP

(57) ABSTRACT

There is provided a heterogeneous communications network. The heterogeneous communications network comprises: a macro cell; a small cell provided within the macro cell; and a user equipment provided within the macro cell, wherein the user equipment is operable to receive control-plane information from the macro cell and user-plane information from the macro cell and/or the small cell, and wherein the user equipment is operable to transmit a connection request based on the received control-plane information, the macro cell and/or small cell are operable to
(Continued)

determine which of the macro cell and the small cell is to operate as the serving cell for the user equipment based on the connection request, and the determined serving cell is operable to transmit a connection response to the user equipment.

15 Claims, 5 Drawing Sheets

(51) Int. Cl.
*H04W 48/00* (2009.01)
*H04W 76/00* (2018.01)
*H04W 36/00* (2009.01)
*H04W 52/02* (2009.01)
*H04W 72/04* (2009.01)
*H04L 1/02* (2006.01)
*H04L 5/00* (2006.01)
*H04W 36/04* (2009.01)
*H04W 48/20* (2009.01)
*H04W 84/04* (2009.01)
*H04W 72/12* (2009.01)
*H04B 7/024* (2017.01)

(52) U.S. Cl.
CPC ... *H04W 36/0055* (2013.01); *H04W 36/0094* (2013.01); *H04W 36/30* (2013.01); *H04W 48/00* (2013.01); *H04W 52/0206* (2013.01); *H04W 72/044* (2013.01); *H04W 76/00* (2013.01); *H04B 7/024* (2013.01); *H04L 5/0053* (2013.01); *H04W 36/04* (2013.01); *H04W 48/20* (2013.01); *H04W 72/12* (2013.01); *H04W 84/045* (2013.01); *Y02D 70/00* (2018.01); *Y02D 70/1262* (2018.01); *Y02D 70/24* (2018.01); *Y02D 70/442* (2018.01)

(58) Field of Classification Search
CPC ..... H04W 76/00; H04W 48/00; H04W 36/30; H04L 5/0048; H04L 1/02; Y02D 70/00; Y02D 70/24; Y02D 70/1262; Y02D 70/442

See application file for complete search history.

(56) References Cited

U.S. PATENT DOCUMENTS

| | | | |
|---|---|---|---|
| 2010/0067443 A1* | 3/2010 | Luo | H04L 5/0048 370/328 |
| 2012/0213109 A1* | 8/2012 | Xu | H04B 7/024 370/252 |
| 2013/0003668 A1* | 1/2013 | Xiao | H04L 5/001 370/329 |
| 2013/0021926 A1 | 1/2013 | Geirhofer et al. | |
| 2013/0028109 A1* | 1/2013 | Jongren | H04W 16/32 370/252 |
| 2013/0028180 A1 | 1/2013 | Gao et al. | |
| 2013/0301439 A1* | 11/2013 | Heo | H04W 76/048 370/252 |
| 2013/0336260 A1* | 12/2013 | Damnjanovic | H04L 5/0053 370/329 |
| 2014/0128078 A1* | 5/2014 | Zhu | H04W 52/0206 455/437 |
| 2015/0049649 A1* | 2/2015 | Zhu | H04L 5/0092 370/277 |

OTHER PUBLICATIONS

Hiroyuki Ishii et al., "A Novel Architecture for LTE-B: C-plane/U-plane split and Phantom Cell concept," GC'12 Workshop: International Workshop on Emerging Technologies for LTE-Advanced and Beyond—4G, IEEE, pp. 624-630, XP032341446, 2012.

"3rd Generation Partnership Project; Technical Specification Group Radio Access Network; Evolved Universal Terrestrial Radio Access (E-UTRA); Study on Small Cell Enhancements for E-UTRA and E-UTRAN—Higher layer aspects (Release 12)," 3GPP TR 36.842 V0.2.1, pp. 1-51, XP050718697, Aug. 2013.

International Search Report for PCT/EP2014/002505 dated Nov. 25, 2014.

* cited by examiner

COMMUNICATIONS NETWORK, MACRO CELL, SMALL CELL, COMMUNICATIONS SYSTEM AND COMMUNICATIONS METHOD

FIELD OF THE INVENTION

The present invention relates to a communications network, a macro cell, a small cell, a communications system and a communications method.

BACKGROUND OF THE INVENTION

In a heterogeneous telecommunications network comprising macro and small cells, the control-plane, which is closely related to the cell identity and the handover procedure, may be solely transmitted by the umbrella macro cells, whereas the user-plane, which carries user equipment (UE) specific information, can be transmitted by both the umbrella macro and the underlay small cells. In order to allow for a more flexible mobility management, the umbrella macro cells may handle the radio resource control (RRC) layers of UEs connected to the underlay small cells. As a result, the UEs use the control-plane of the umbrella macro cells to synchronize and access the network, while the umbrella macro or the underlay small cells provide their data channels. In addition, since only the umbrella macro cells broadcast cell identities (a handover differentiator), UEs do not trigger standard macro-to-small cell or small-to-small cell handovers.

However, even though the small cells in this heterogeneous communications network do not have a macro-cell-like identity, some form of cell identification is still required for the network to identify the most adequate small cell to serve a UE and transmit its data channels.

It is therefore desirable to provide mechanisms that allow cell-to-UE association in a network with split control-plane and user-plane.

SUMMARY OF THE INVENTION

According to a first aspect of the invention, there is provided a heterogeneous communications network, comprising: a macro cell; a small cell provided within the macro cell; and a user equipment provided within the macro cell, wherein the user equipment is operable to receive control-plane information from the macro cell and user-plane information from the macro cell and/or the small cell, and wherein the user equipment is operable to transmit a connection request based on the received control-plane information, the macro cell and/or small cell are operable to determine which of the macro cell and the small cell is to operate as the serving cell for the user equipment based on the connection request, and the determined serving cell is operable to transmit a connection response to the user equipment.

The control-plane information may indicate physical random access channel resources and random access preambles. The control-plane is broadcast to UEs and may indicate, among other parameters, physical random access channel resources and random access preambles.

The user equipment may identify the most appropriate cell to operate as the serving cell.

If the macro cell is identified to be the most appropriate cell to operate as the serving cell to be the macro cell, the connection request may comprise a random access preamble. If the small cell is identified to be the most appropriate cell to operate as the serving cell to be the small cell, the connection request may comprise a modified random access preamble.

The network may comprise a plurality of small cells each identified by individual CSI-RS signals.

The modified random access preamble or part of it comprises (is scrambled with) the CSI-RS signal of the most appropriate small cell to operate as the serving cell.

Only the small cell identified by the CSI-RS signal in the modified random access preamble may be operable to decode the modified random access preamble and upon decoding the modified random access preamble that small cell may be determined to be the serving cell of the user equipment.

The best serving cell may be identified through inter-base station coordination.

According to a second aspect of the present invention, there is provided a macro cell in a heterogeneous communications network comprising a small cell provided within the macro cell and a user equipment provided within the macro cell, wherein the user equipment is operable to receive control-plane information from the macro cell and user-plane information from the macro cell and/or the small cell, wherein the macro cell is operable to: transmit control plane information to the user equipment; receive a connection request from the user equipment; determine which of the macro cell and the small cell is to operate as the serving cell for the user equipment based on the connection request; and if it is determined that the macro cell is to operate as the serving cell for the user equipment, transmit a connection response to the user equipment.

According to a third aspect of the present invention, there is provided a small cell in a heterogeneous communications network comprising a macro cell and a user equipment provided within the macro cell, wherein the user equipment is operable to receive control-plane information from the macro cell and user-plane information from the macro cell and/or the small cell, wherein the small cell is operable to: receive a connection request from the user equipment; determine which of the small cell and the macro cell is to operate as the serving cell for the user equipment based on the connection request; and if it is determined that the small cell is to operate as the serving cell for the user equipment, transmit a connection response to the user equipment.

According to a fourth aspect of the present invention, there is provided a user equipment in a heterogeneous communications network comprising a macro cell and small cell provided within the macro cell, wherein the user equipment is provided within the macro cell and is operable to receive control-plane information from the macro cell and user-plane information from the macro cell and/or the small cell, wherein the user equipment is operable to: receive control-plane information from the macro cell; transmit a connection request based on the received control-plane information; and receive a connection response from either the macro cell or small cell that is determined to be the serving cell for the user equipment based on the connection request.

According to a fifth aspect of the present invention, there is provided a communications method for a heterogeneous communications network comprising a macro cell, a small cell provided within the macro cell and a user equipment provided within the macro cell, wherein the user equipment is operable to receive control-plane information from the macro cell and user-plane information from the macro cell and/or the small cell, the method comprising: receiving control-plane information from the macro cell at the user equipment; transmitting a connection request based on the received control-plane information from the user equipment; determining which of the macro cell and the small cell is to operate as the serving cell for the user equipment based on the connection request; and transmitting a connection response to the user equipment from the determined serving cell.

According to a sixth aspect of the present invention, there is provided a heterogeneous communications network, comprising: a macro cell; a small cell provided within the macro cell; and a user equipment provided within the macro cell, wherein the user equipment is operable to receive control-plane information from the macro cell and user-plane information from the macro cell and/or the small cell, and the user equipment is being served by either the macro cell or the small cell as a serving cell, wherein the user equipment is operable to periodically check a handover condition using measurements from the serving cell and neighbouring cells and transmit a measurement report to the serving cell indicating that a better serving cell is present, and the serving cell is operable to perform a handover to the better serving cell by transmitting an RRCConnection Reconfiguration delta message to the user equipment in which only the changes between the serving cell and the better serving cell are indicated.

The better serving cell may be identified using power measurements or a precoding matrix estimated over CSI-RS According to a seventh aspect of the invention, there is provided a communications method for a heterogeneous communications network comprising a macro cell, a small cell provided within the macro cell and a user equipment provided within the macro cell, wherein the user equipment is operable to receive control-plane information from the macro cell and user-plane information from the macro cell and/or the small cell, and the user equipment is being served by either the macro cell or the small cell as a serving cell, the method comprising: checking a handover condition using measurements of the serving cell and neighbouring cells; transmitting a measurement report to the serving cell indicating that a better serving cell is present; and performing a handover to the better serving cell by transmitting an RRCConnection Reconfiguration delta message to the user equipment in which only the changes between the serving cell and the better serving cell are indicated.

According to an eighth aspect of the invention, there is provided a computer program product operable when executed on a computer to perform the method of the above fifth and seventh aspect.

Further particular and preferred aspects of the invention are set out in the accompanying independent and dependent claims.

BRIEF DESCRIPTION OF THE DRAWINGS

Some embodiments of the apparatus and/or methods in accordance with embodiment of the present invention are now described, by way of example only, with reference to the accompanying drawings, in which.

DESCRIPTION OF EMBODIMENTS

In order to increase the energy efficiency of networks, in a network architecture where signalling and data networks are separated is proposed. On the one hand, the signalling network is designed in order to guarantee a wide coverage area and its transceivers are designed to be energy efficient for low data rates and long-range transmissions. On the other hand, the data network is flexible and smart, and designed for high data rates. This separation brings two immediate advantages. Firstly, signalling base stations, which are only in charge of providing the always connected signalling service, can be simplified. Secondly, data base stations can be switched off as soon as no user equipment (UE) is active under their coverage. As a result, at the areas where no UEs are active, no signal from any data base station is provided in order to avoid the waste of energy and radio resources. As soon as there is an active UE, it can communicate to the signalling base station its request and the system can provide data connectivity by turning on a data base station that can serve the UE. Ideally, the UE is spotlighted with the data service only where and when it is needed.

A simple way to realize a network with split control-plane and user-plane is through conventional Carrier Aggregation (CA) using Remote Radio Heads (RRH). In this network configuration, the base band processing is performed in a centralized node, e.g., the central processing unit, which is also in charge of providing coverage and managing the RRC layers of UEs. RRHs transmit user data in specific component carriers. Due to its centralized nature, a requirement for this network configuration is the optical fibre link between the central processing unit and its RRHs. CA cross-scheduling is also a key feature of this network configuration, since it allows operating different carriers in the different RRHs, while only transmitting control information in a subset of them. However, this network configuration has the typical drawbacks of a centralized architecture, namely that the centralized processing at the central processing unit may limit the number of RRHs that it can support (scalability issues), throughput and latency requirements for backhaul may be quite stringent, and single points of failure could also occur.

In order to avoid the disadvantages of a centralized architecture, a network configuration is proposed with split control-plane and user-plane, where small cells (sometimes referred to as phantom-cells or soft-cells) do not rely on a centralized processing unit. For example, small cells are capable of independent base band processing.

Figure 1:
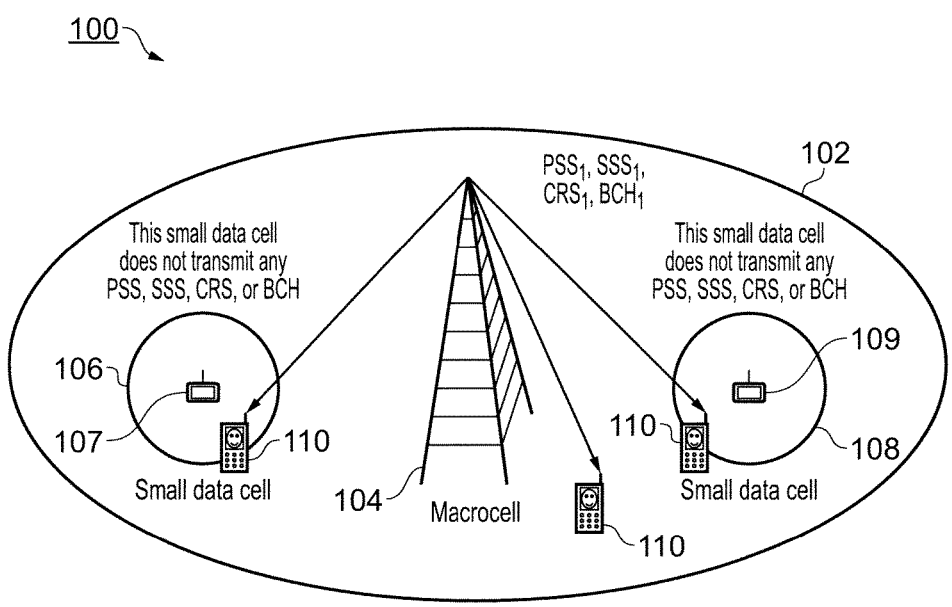
FIG. 1 schematically shows a heterogeneous communications network.

FIG. 1 shows a heterogeneous communications network comprising a macro cell 102 having a macro cellular base station 104, small cells 106 having a small cell base stations 107 and a small cell 108 having a small cell base station 109. A plurality of user equipment (UE) 110 are served by the macro cell and/or small cells in the heterogeneous communications network.

It should be noted that the small cells 106, 108 in FIG. 1 do not transmit any control plane identification information such as primary synchronization signal (PSS), secondary synchronization signal (SSS), broadcast channel (BCH) and common reference signal (CRS). The small cells 106, 108 only engage in UE data transmissions. In other words, the small cells do not transmit primary portions of the control-plane, but handle the transmission of user-plane information. Such small cells will be referred in the following to as small data cells.

Further, it is noted that the control-plane identification information is provided to UEs 110 only by the umbrella macro cell 102 on behalf of the hosted small data cells 106, 108. The umbrella macro cell 102 to which each small data cell is anchored may operate in the same or a different frequency band as their small data cells.

FIG. 1 illustrates a heterogeneous network in which the umbrella macro cell 102 transmits control- and user-plane information, while small data cells 106, 108 only transmit user-plane information and rely on the macro cell control-plane information for UE synchronization. Since the small data cells 106, 108 do not transmit any control plane, there is no need for triggering standard handovers among the umbrella macro cells and small data cells or among small data cells themselves. Moreover, since small data cells do not transmit in the resource elements used by the umbrella macro cells (and/or neighbouring cells) to transmit their CRSs, UEs wideband signal to interference plus noise ratio (SINR) estimations are free of any inter-cell interference and thus radio link failures are significantly mitigated in co-channel roll-outs.

Further, in case of co-channel deployment, the small data cells 106, 108 may not transmit any data on the resource elements used by their umbrella macro cells to transmit their CRSs to allow UEs a good detection of the macro cell CRS within its coverage area, and thus facilitate mobility management and mitigate radio link failure (UEs declaring out-of-sync by themselves because they cannot decode the macro cell CRS).

Also, the proposed small data cells 106, 108 may transmit both the CSI-RS to allow UEs served by small data cells to estimate channel state information, and the demodulation-reference Signals (DM-RS) to provide UEs served by small data cells with a pilot signal for coherent demodulation.

CSI-RSs are used not only for channel estate information estimation purposes, but also as soft-pilots to (i) allow UEs to identify the strongest small data cell, (ii) compute the path loss to it for UL fractional power control purposes and (iii) estimate the multi-antenna precoder/beamformer weights to maximize SINR.

Since the number of independent CSI-RS available is limited and may be smaller than the number of small data cell deployed per macro cell, the proposed network is equipped with a method, centralized and/or distributed, able to efficiently reuse CSI-RS across the network such that confusion and collision problems are mitigated.

As the control-plane and user-plane are split in the network of FIG. 1, mobility management in an RRC-Idle and an RRC-Connected mode can be enhanced with respect to the conventional scenario.

RRC-Idle mode is a UE state in which the UE is switched on but does not have any established RRC layer, meaning that the presence of the UE is unknown to the network because it does not have any context for the UE. The location of the UE in RRC-Idle is known to the network at the level of tracking areas, and the UE is responsible for synchronizing and accessing the network through a random access procedure in order to establish a context with the network.

RRC-Connected is a UE state in which the UE is switched on and has an established RRC layer, meaning that the presence of the UE is known to the network because it has a context for the UE. The RRC layers control the communications between BSs and UEs at the radio interface and the mobility of UEs across cells through the handover method.

Embodiments propose new cell selection and handover mechanisms that allow an adequate cell-to-UE association in a network with split control-plane and user-plane. Embodiments specify mechanisms for RRC-Idle cell (re)selection and RRC-Connected handover.

RRC-Idle Mode

In RRC-Idle mode, a UE may synchronize with the network through the most appropriate cell, using one of the following three mechanisms, which are based on a modified random access procedure.

These mechanisms are used when the UE is in RRC-Idle mode and either i) the UE has data to transmit on the uplink or ii) after the UE is paged because it has data to receive on the downlink. In a network with split control-plane and user-plane, paging messages should be transmitted through macrocells only and coordinated with the UE's discontinuous reception (DRX) modes for energy efficiency reasons. In this way, small data cells and UEs can go into sleep mode for longer periods of time and save energy.

Note that the frequency-time resources of the physical random access channel (PRACH) for an umbrella macrocell 102 and all its small data cells 106, 108 in the network 100 of FIG. 1 are the same and are specified to the UE through the umbrella macrocell system information. Therefore, all these cells can receive the random access preamble of a UE.

In a first cell-selection method, a UE may follow a random access procedure using the system information broadcast by the umbrella macrocell 102. In more detail, the UE first sends the random access preamble in the indicated PRACH resources, and then the umbrella macrocell 102 replies with the random access response, i.e., the initial UE connection is always through the macrocell 102. The macrocell 102 may immediately hand the UE over a small data cell if necessary using the procedures that we will described below in relation to the RRC-Connected mode section.

However, in the first cell-selection method, the UE may not be able to receive the random access response if this UE is nearby a small data cell due to inter-cell interference.

Therefore, in a second proposed cell-selection method, the UE may first send the random access preamble in the indicated PRACH resources, and then the network decides by using a subsequently specified inter-base station (BS) coordination procedure which is the most suitable small data cell for serving the UE (e.g., the cell that receives the random access preamble with the highest received signal strength). The selected cell through the inter-BS coordination procedure replies with the random access response, and later transfers the RRC context to the umbrella macro cell.

However, the inter-BS coordination of the second cell-selection method may not be desired due to signalling overhead. Therefore, in a third cell-selection method, the UE may first estimate which is the most suitable cell to serve the UE based on CRS/CSI-RS measurements, and may then use an enhanced-random access procedure, in which, if the most adequate cell is a small data cell, the random access preamble is scrambled with the Gold code of this small data cell CSI-RS, thus implicitly identifying the serving cell. Then, after receiving the preamble either the umbrella macro cell may instruct the selected cell to provide the random access response or the selected small cell directly follows with the random access response and later transfers the RRC context to the macro cell.

First Cell-Selection Method

FIGS. 2A and 2B illustrate the proposed macro-centric random access procedure of the first cell-selection method in the RRC-Idle mode. As can be seen in FIG. 2A, heterogeneous communications network 200 comprises a macro cell 202 having a macro cellular base station 204, a plurality of small data cells $206_1$ to $206_N$ having a small cell base stations $207_1$ to $207_N$ and a UE 210 served by the macro cell and/or small cells in the heterogeneous communications network 200. In the heterogeneous communications network 200 of FIG. 2A, each small data cell may be identified by a different CSI-RS.

In the first cell-selection method, the UE follows a standard random access procedure, and sends a random access preamble in the PRACH resources. The network assumes the umbrella macro cell as the master BS, which proceeds with the random access response to the UE. In this case, inter-cell interference coordination may be needed to avoid small data cells jamming the random access response and other messages that the umbrella macro cell sends to UEs that are located nearby small data cell BSs (classic victim UE problem). After establishing context with the umbrella macro cell, i.e., when the UE is in RRC-Connected mode, if a small data cell is more appropriate than the umbrella macro cell to serve the UE, a change of serving BS is required (change from macro to small data cell). This case is covered in the following description relating to the RRC-Connected mode.

FIG. 2B illustrates the first cell-selection method. As shown in FIG. 2B, the macro cell transmits system information including available preambles to the UE at step 250. At step 252, the UE receives that system information and transmits a random access preamble to the macro cell. At step 254, the macro cell successfully decodes the random access preamble and transmits a random access preamble response to the UE. At step 256, the UE is synchronised with the network and transmits over the UL-SCH its terminal indentity to the macro cell. At step 258, the macro cell and the UE perform contention resolution to determine if a more appropriate cell is available as the serving cell and at step 260 a handover to a small cell is performed if it is determined to be a better serving cell. As step 262, the UE and small cell communicate uplink and/or downlink data.

Second Cell-Selection Method

Figure 3:
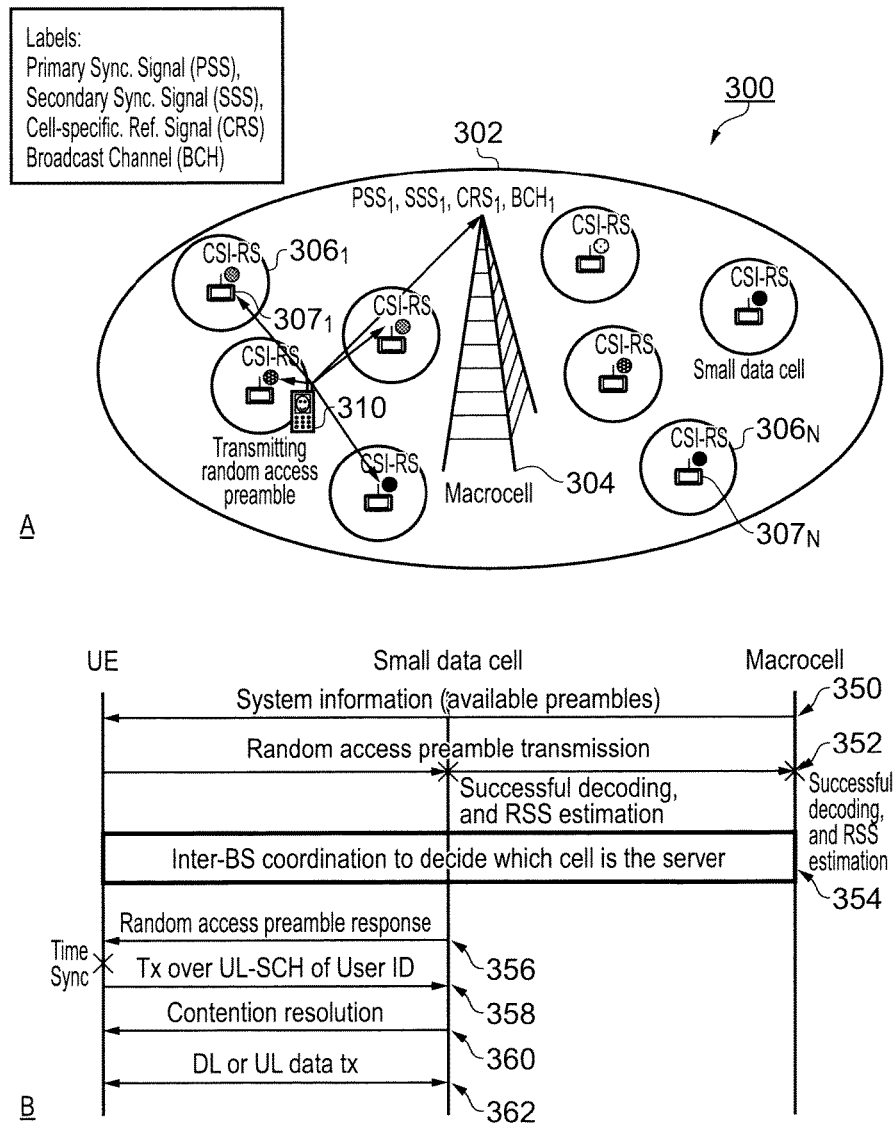
FIG. 3a schematically shows heterogeneous communications network according to a second embodiment.
FIG. 3b shows the enhanced random access procedure according the second embodiment.

FIGS. 3A and 3B illustrate the second cell-selection method in the RRC-Idle mode. As can be seen in FIG. 3A, heterogeneous communications network 300 comprises a macro cell 302 having a macro cellular base station 304, a plurality of small data cells $306_1$ to $306_N$ having a small cell base stations $307_1$ to $307_N$ and a UE 310 served by the macro cell and/or small cells in the heterogeneous communications network 300. In the heterogeneous communications network 300 of FIG. 3A, each small data cell may be identified by a different CSI-RS.

Figure 2:
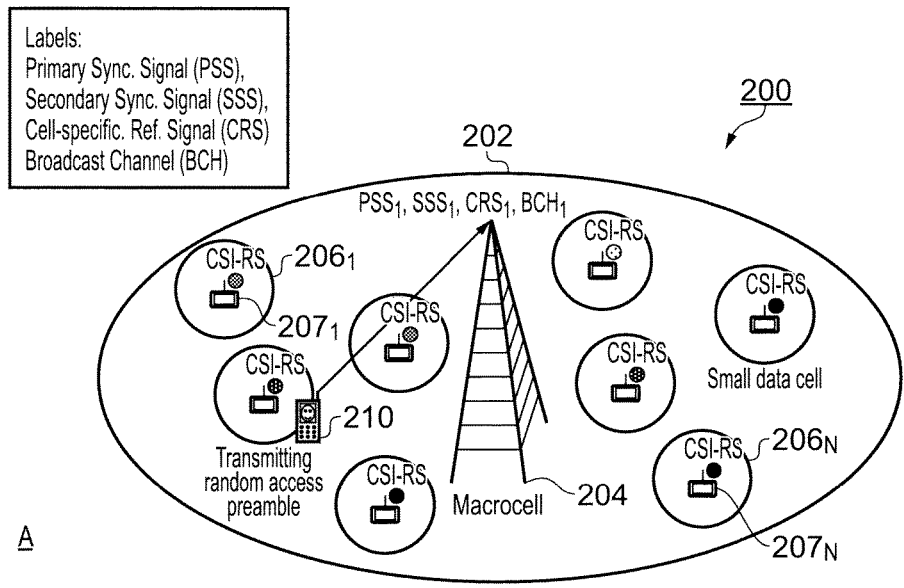
FIG. 2a schematically shows heterogeneous communications network according to a first embodiment.
FIG. 2b shows the enhanced random access procedure according to the first embodiment.
Figure 2:
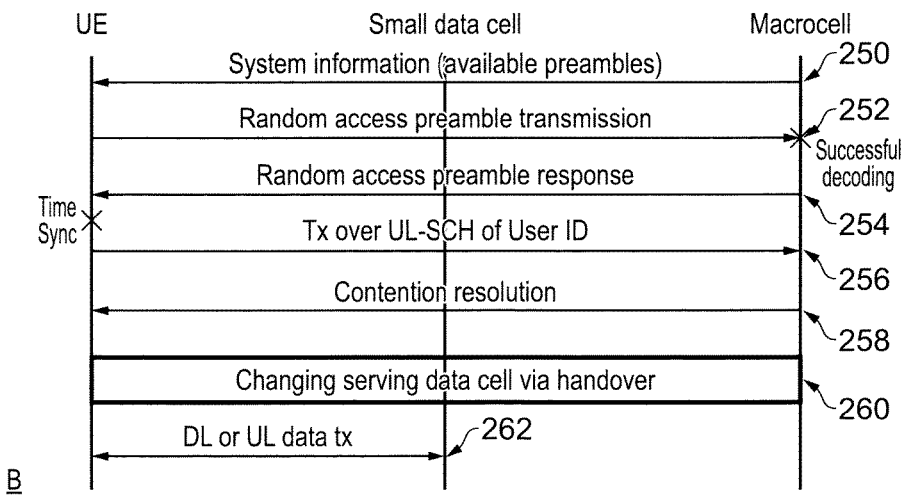

In the second cell-selection method, the UE also follows a standard random access procedure as in FIG. 2, and sends a random access preamble in the PRACH resources. Thereafter, the network exploits an inter-BS coordination procedure to decide which cell among those cells that were able to listen the random access preamble is the most appropriate to serve the UE. This inter-BS coordination can follow a macro-centric procedure, in which the small data cells covey information to the umbrella macro cell, which then performs the decision making and distribute the solutions. The conveyed information by the small data cells to the umbrella macro cell can be the random access preamble received signal strength or quality, and the most appropriate cell could be the one that received the random access preamble with the highest received signal strength or quality. After this inter-BS coordination procedure, the selected cell follows with the random access response to the UE. In this way, since the strongest cell provides the random access response, inter-cell interference is mitigated and thus there is no need for the inter-cell interference coordination of the previous macro-centric random access procedure. The cell following with the random access response handles time alignment by using the standard procedure. The RRC layer of the UE is managed by the umbrella macrocell after successful handover.

FIG. 3B illustrates the second cell-selection method. As shown in FIG. 3B, the macro cell transmits system information including available preambles to the UE at step 350. At step 352, the UE receives that system information and transmits a random access preamble to the macro cell. At step 354, the macro cell and the small cell successfully decode the random access preamble and perform inter-BS coordination to decide which of the small cell of the macro cell is the better serving base station for the UE. At step 356, the small cell is determined to be the better serving cell for the UE and the small cell transmits a random access preamble response to the UE. At step 358, the UE is synchronised with the network and transmits over the UL-SCH its terminal identity to the small cell. At step 360, the small cell and the UE perform contention resolution to determine if a more appropriate cell is available as the serving cell and at step 362 the UE and small cell communicate uplink and/or downlink data.

In the second cell-selection method, let S be the random access preamble signal sent from a UE and received by BS k containing M antennas, then the received signals at the antennas of BS k are modulated by the wireless channels as follows:

$$z_k = h_k s$$

The correlation between the random access preamble signal S and its received estimate $z_k$ at BS k provides the received signal strength from the UE to the BS, which is expressed as:

$$r_k = \text{average } \{z_k s\}$$

Comparing these correlation values for all neighbouring cells through the following inter-BS coordination process specifies the serving cell, i.e., the cell with the maximum received signal strength.

Cell selection via inter-BS coordination: Compare the correlation outputs from all neighbouring cells and choose the corresponding strongest BS k.

Figure 4:
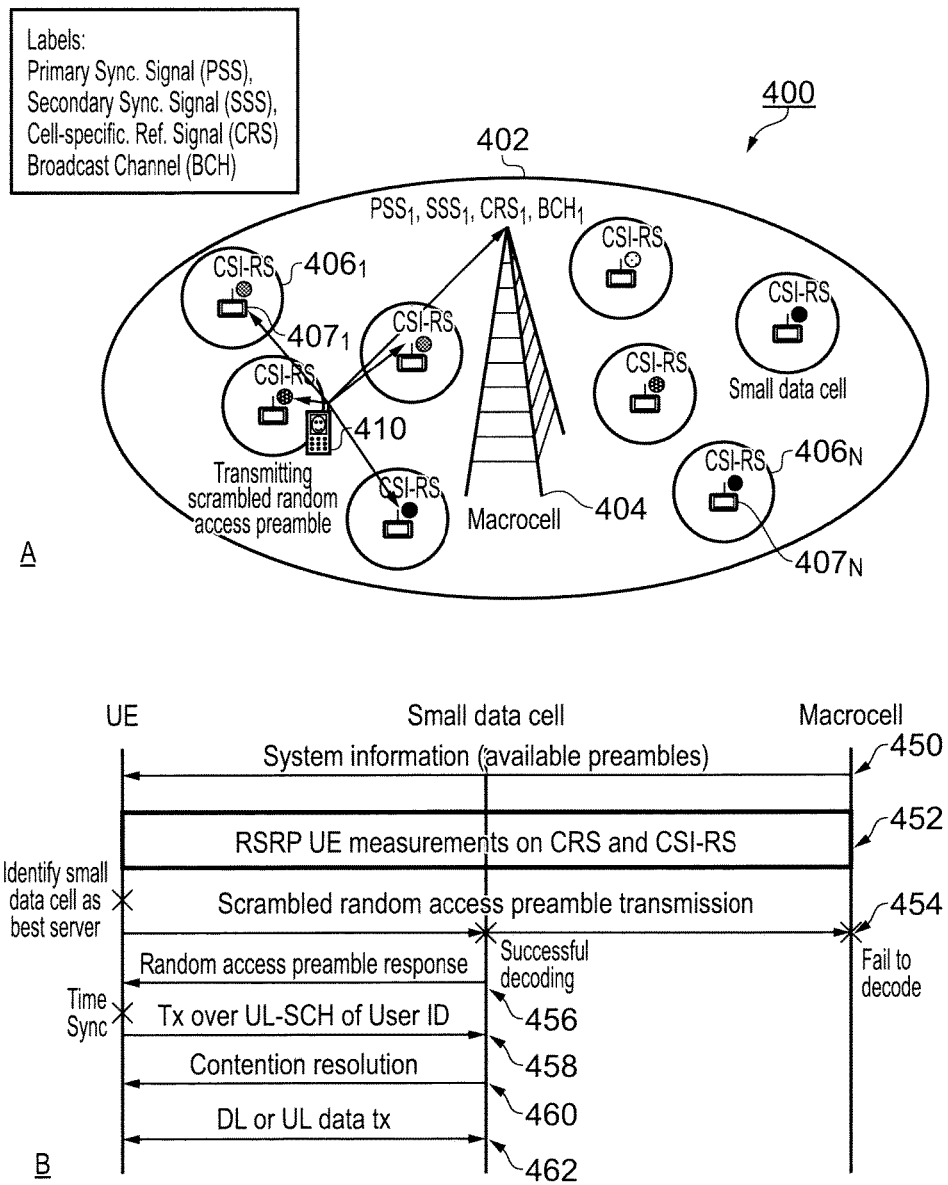
FIG. 4a schematically shows heterogeneous communications network according to a third embodiment.
FIG. 4b shows the enhanced random access procedure according the third embodiment.

Choose base station $k$ such that $\max_k \Sigma |r_k| \forall k \in \{i, \ldots, K\}$ Third Cell-Selection Method FIGS. 4A and 4B illustrate the third cell-selection method in the RRC-Idle mode. As can be seen in FIG. 4A heterogeneous communications network 400 comprises a macro cell 402 having a macro cellular base station 404, a plurality of small data cells $406_1$ to $406_N$ having a small cell base stations $407_1$ to $407_N$ and a UE 410 served by the macro cell and/or small cells in the heterogeneous communications network 400. In the heterogeneous communications network 400 of FIG. 4A, each small data cell may be identified by a different CSI-RS.

Individual CSI-RS signals can be distinguished by embedded Gold code sequences. If a small data cell is the most adequate cell, the UE scrambles the random access preamble with the Gold code of a CSI-RS corresponding to the selected small data cell. If the macro cell is the most appropriate cell, the UE does not scramble the standard random access preamble. After receiving a random access preamble in the PRACH resources, either the umbrella macro cell instructs the selected cell to provide the random access response or the selected small cell directly follows with the random access response and later transfers the RRC context to the macro cell.

In the second case, after receiving a random access preamble in the PRACH resources, each small data cell will attempt to decode the received random access preamble making use of its CSI-RS Gold code. Then, if the decoding of the scrambled random access preamble checks, the small data cell knows that the random access preamble was intended for it, and that it is the most adequate cell to serve the UE. The selected small data cell should thus follow with the random access response to the UE. On the contrary, if the decoding of the scrambled random access preamble does not check, the small data cell does not take any action, since it knows that the random access procedure was not intended for it. The cell following with the random access response handles time alignment by using the standard procedure. The RRC layer of the UE is managed by the umbrella macrocell after successful handover.

FIG. 4B illustrates the third cell-selection method. As shown in FIG. 4B, the macro cell transmits system information including available preambles to the UE at step 450. At step 452, the UE estimates which is the most suitable cell to serve the UE based on CRS/CSI-RS measurements. At step 454, if a small cell is estimated to be the most suitable serving cell, the UE transmits an enhanced random access preamble to the macro cell comprising the CSI-RS of the small cell. The enhanced random access preamble may be a random access preamble that is scrambled with the Gold code of this small data cell CSI-RS. The macro cell cannot decode the enhanced random access preamble, but the small cell identified by the enhanced random access preamble can successfully decode the enhanced random access preamble. At step 456, the small cell successfully decodes the enhanced random access preamble transmission and transmits a random access preamble response to the UE. At step 458, the UE is synchronised with the network and transmits over the UL-SCH its terminal identity to the small cell. At step 460, the small cell and the UE perform contention resolution to determine if a more appropriate cell is available as the serving cell and at step 462 the UE and small cell communicate uplink and/or downlink data.

Different approaches can be used for the transmission of small cell CSI-RS and UE scrambled random access preamble depending on the number of antennas that the serving BS and UE have. For the sake of clarity, and without incurring any loss of generality, the umbrella macro cells are not considered in the following formal description.

Small Data Cell BSs with One Antenna

The neighbouring small data cells transmit CSI-RS in the form of Gold codes, and the UE receives a superposition of Gold code signals from K small data cell BSs. Let $x=[x[1], \ldots, x[L]]$ correspond to this received signal at the UE of length L. For simplicity, we assume that all small data cell BSs in the neighbourhood are synchronized to each other. During the CSI-RS estimation phase, the UE compares the signal strengths of the CSI-RSs from all small data cell BSs, and selects, as serving cell, BS k, where $k \in \{1, \ldots, K\}$ corresponds to the index of the strongest component, i.e., $$\text{Choose base station } k \text{ such that } y_k = \max|y| \quad (1)$$

where $y = C^T x$ and C is the K×L Gold code matrix of all considered neighbouring small data cells: $C=[c_1, \ldots, c_K]$ and $c_k=[c_k[1], \ldots, c_k[L]]$ Small Data Cell BSs with More than One Antenna For a small data cell BS containing multiple-antennas, each antenna may transmit a unique Gold code as the pilot signal. Thus, for a small data cell BS k with M antennas, we have a set of CSI-RS $C_k=[c_{k,1}, \ldots, c_{k,M}]$. In this case, the UE first obtains the strongest antenna m from each small data cell and then select the strongest BS k, as explained above.

$$y_k = \Sigma |C_k x| \text{ and choose BS with largest } y_k \text{ as in (1)}. \quad (2)$$

Small Data Cell Bss with More than One Antenna and Restricted Gold Codes

The number of distinct CSI-RS sequences is limited and using a distinct Gold code for each antenna and small data cell may not always be possible. In order to account for this, CSI-RS for cell identification purposes may be transmitted from only one antenna or a subset of them in a multi-antenna small data cell BS. We then identify the strongest small data cell k as explained above.

MIMO Precoder for Random Access Preamble

Provided that UEs and BSs have multiple antennas, a precode could be applied to the random access preamble so that its signal quality is maximized at the selected small data cell BS. Note that the UE knows a priori the strongest cell based on the cell selection procedures described above.

Let S be the CSI-RS transmitted by small data cell BS k and received by all neighbouring UEs. Consider a UE u with N antennas, then the received CSI-RSs at the UE antennas are modulated by the wireless channel as:

$$z_u = h_u s$$

The correlation between a CSI-RS of BS k and its received estimate at UE u provides the spatial diversity of the wireless channel from the BS to the UE, which is expressed as:

$$r_u = \text{average } \{z_u s\}.$$

Designing precoder weights to be used with multiple antennas at the UE to maximize this correlation will maximize the SINR of the random access preamble at the BS:

$$w_k = \arg \max_w \|w^T r_k\|$$

The optimal $w_k$ can be obtained by choosing the basis vector of $r_k$.

Provided that UEs and BSs have multiple antennas, a precode could be applied to the random access preamble in the above second cell-selection method to facilitate the identification of the strongest cell in the inter-BS coordination process.

RRC-Connected Mode

In a first handover method, the traditional UE CRS measurements that drive the standard handover procedure are replaced by UE CSI-RS measurements when the measured cell is a small data cell, and then the UE alerts the network of possible changes of serving cell through a measurement report.

In a second handover method, handover triggering is not handled by the UE, but by the network based on standard channel state information (CSI) reports provided by the UE on a regular basis and measured over CSI-RSs. Based on the CSI pre-coding matrix, the serving cell can discern which cell should serve the UE and then initiate the change.

In both cases, since the umbrella macro cell and its underlay small data cells have the same physical cell identity (PCI) and PARCH resources, and the UE does not need to change its radio network temporal identifier (RNTI), the Handover_Command can be simplified, which should help its successful decoding.

In RRC-Connected mode, a UE may change its serving BS, from the source cell to the most appropriate target cell, using the following two mechanisms. It is important to note that in the RRC-Connection mode, the UE has both a serving/source cell and an RRC layer.

Changing CRS for CSI-RS

The UE periodically checks the handover entry condition (e.g., serving cell received power multiplied by a hysteresis margin is weaker than neighbouring cell received power) based on i) CRS measurements over neighbouring macro cells and CSI-RS measurements over neighbouring small data cells and ii) using standard L1 and L3 filtering. If the handover entry condition is met, the UE follows the standard procedure and initiates time-to-trigger. If after time-to-trigger the handover entry condition still holds, the UE sends a measurement report to the serving cell indicating that there may be a better serving cell. Then, the handover preparation phase followed by the execution phase will take place. If the source and target cells are within the coverage of the same umbrella macro cell, a simplified handover preparation and execution phase may follow since the source and target cell use the same control plane and appear to be the same cell to the UE in the proposed configuration. For example, instead of a full RRCConnectionReconfiguration message, an RRC-ConnectionReconfiguration delta message can be sent to the UE, in which only the changes in configuration between the target and source are indicated. Since the source and target cell has the same PCI and PRACH resources, and the UE does not need to change its RNTI in the proposed configuration when changing cell, this RRCConnectionReconfiguration delta message can be much smaller than the in traditional configuration or could even be neglected (if the source and target cell operate in the same frequency carrier and has the same DL/UL bandwidths and security algorithms), which should help with (or even avoid the need for) the Handover_Command decoding. Otherwise, if the source and target cells have a different control-plane, standard handover preparation and execution phases follow.

In order to gain time alignment with the target cell, it can order the UE to perform a contention-free random access procedure, since the RNTI of the UE is known.

Figure 5:
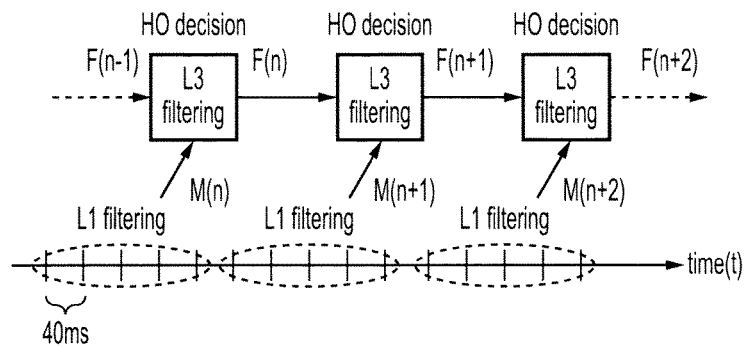
FIG. 5 shows the CSI-RS RSRP layer 1 and layer 3 filtering.
Figure 6:
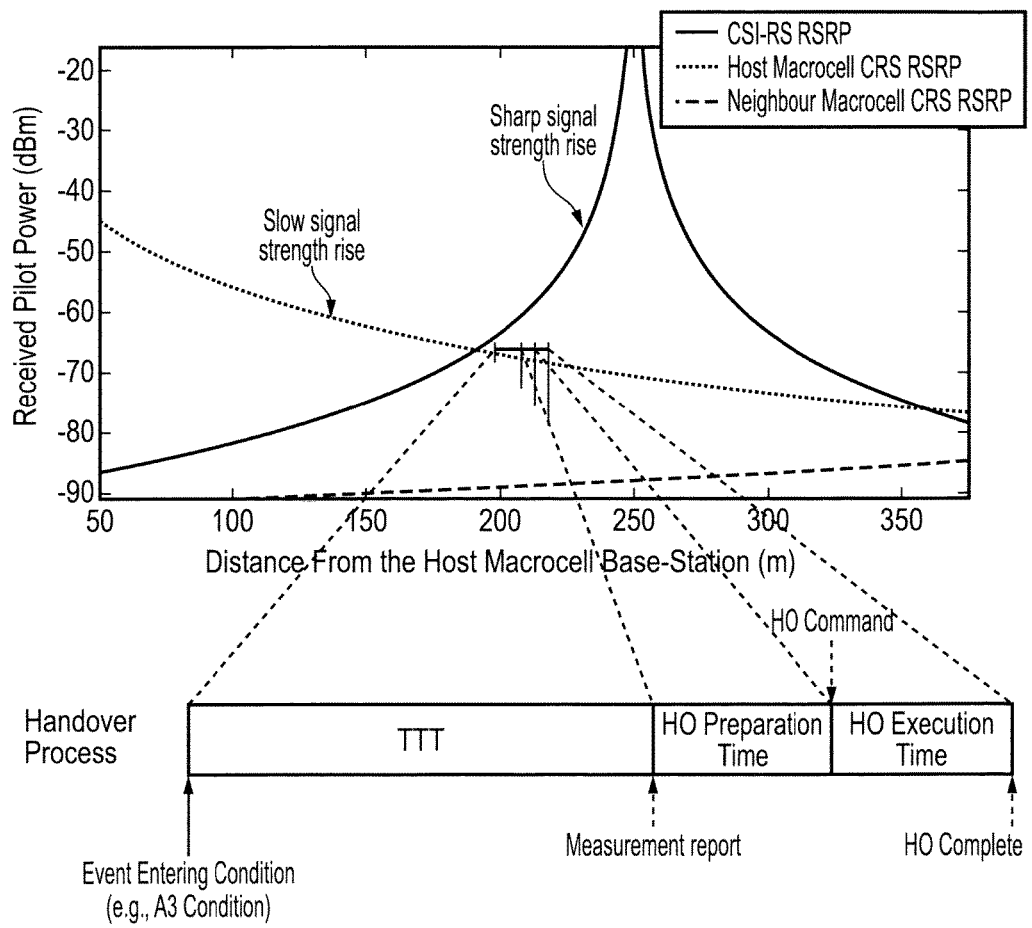
FIG. 6 shows a Handover based on CRS and CSI-RS measurements.

FIG. 5 shows the CSI-RS RSRP layer 1 and layer 3 filtering, while FIG. 6 shows the handover process.

Using MIMO CSI Feedback

Consider the RRC_connected mode, where the UE periodically feeds back MIMO CSI reports over CSI-RS information signals when in MIMO mode. This feedback can be used to select the appropriate serving BS as well as to perform coordinated MIMO processing over a combination of BSs.

Let s denote the CSI feedback sent from a UE and received at BS k containing M antennas, then the received signals at the antennas of BS k are modulated by the wireless channels as follows:

$$z_k = h_k s$$

The correlation between the CSI feedback and its received estimate $z_k$ at BS k provides the CSI measure from the UE to the BS, which is expressed as:

$$r_k = \text{average}\{z_k s\}, \forall k \in \{1, \ldots, K\}.$$

Let $w_n$, $\forall n \in \{1, \ldots, N\}$ be the list of pre-coding vectors that can be used for CSI feedback. Typically, pre-coding vectors are limited to N=64

Joint precoder and BS selection: The objective is to choose the BS k as well as MIMO pre-coding vector n such that the SNR of the signals transmitted from the UE is maximized at the selected BS. Note that this SNR measure for BS k and precoder n is specified by the dot product $$SNR_{k,n} = w_n^T r_k.$$

Stacking the above relation for different BSs and pre-coding vectors leads to the following K=N cross-covariance matrix $$R = \begin{bmatrix} w_1^T r_1 & \cdots & w_N^T r_1 \\ \vdots & \ddots & \vdots \\ w_1^T r_K & \ddots & w_N^T r_K \end{bmatrix}$$

choose BS and precoder weights from R

Coordinated MIMO Processing and Precoder Selection (Subject to Complexity):

The SNR measure in the above covariance matrix R can be replaced by the SINR measure for improved performance. In this case, the SINR measure for BS k and precoder $w_n$ is $$SINR_{n,k} = \frac{w_n^T r_k}{\sum_j w_n^T r_j} \quad \forall j \in \{1, \ldots K\}$$

and $$j \neq k$$

Subsequently, we select the appropriate BS and precoder. The optimal precoder $w_n$ maximizing the signal to leakage ratio from BS k is the basis vectors of $$(\Sigma_j w_n^T r_j)^{-1} w_n^T r_k.$$

Note that a cellular network with inter-BS coordination can be used to perform coordinated MIMO processing. In coordinated MIMO processing, the network computes a linear combination of the precoder output from all BS to maximize the overall SINR at the network. Given the SINR covariance matrix R, this can be obtained by performing a Singular value decomposition or Eigen decomposition of R. Combining these signals using the dominant Eigen vector would provide us with the SINR maximizing network/coordinated case.

After sufficient filtering, and once the serving cell has decided that the UE should be handed over a neighboring cell, then the standard handover, preparation and execution phases should take place. In this case, the UE do not need to take CRS and/or CSI-RS RSRP measurements, initiate time-to-trigger or sent a measurement report. The UE only needs to periodically feedback MIMO alike CSI reports, and the network will take care of selecting the transmission point.

In the above methods, CRS and CSI-RS transmit power should be setup with the same base line transmit power to allow comparison among macrocell CSI and small data cell CSI-RS measurements. A given subset of CSI-RS may not be used for small-cell identification, but could be reserved for the actual MIMO functionality (similarly to the reservation of certain PCIs for small cells). Moreover, small data cells CSI-RSs should be transmitted at least as often as the UEs measure the macrocell RSRP and RSRQ, e.g., every 40 ms.

Two features that may mitigate both radio link and handover failures in the above described proposed network configuration are:

Radio link failure avoidance: Since the small data cells do not transmit any data on the resource elements used by their umbrella macro cells to transmit their CRSs, UEs will always be able to carry out a good detection of the macro cell CRS (i.e., the UE can always see the CRS of the cell that provides the control-plane), and will thus not declare out-of-synchronization/radio link failures by themselves.

Physical Downlink Control Channel (PDCCH) failure mitigation: The proposed network configuration can take advantage of LTE Release 11 features such as Enhanced physical downlink control channel (EPDCCH) to schedule Handover_Command and/or Handover_Complete downlink control information (DCI) messages in appropriate resources. On the contrary to PDCCH, EPDCCH can be scheduled in specific RBs, similarly to UE data—carried on PDSCHs, and thus a great deal of inter-cell interference mitigation can be achieved through inter-cell interference coordination. Efficient EPDCCH scheduling will thus help to alleviate Handover_Command and/or Handover_Complete failures.

The proposed network configuration together with the proposed cell selection and handover procedures may be applicable to allow efficient lightRadio pico cell deployments. Pico cells would become pico data cells. By adopting the proposed network configuration and cell selection and handover procedures, a large number of pico cells could be deployed in large hot spot areas (e.g., downtown Madrid), while allowing seamless mobility for connected UEs. Moreover, since independent scheduling decisions at the umbrella macro cell and pico data cells are allowed, hot spot UEs will still benefit from low latency and large throughputs through spatial reuse. Since pico data cells do not transmit any signalling when there is no active UE, large energy saving can be achieve since these cells can go into sleep mode for longer periods of time. The proposed approach works even for operators with only one carrier, and would facilitate network deployment and reduce power consumption.

For networks with a large number of small data cells, cell selection and handover can be aided by a network architecture where multiple small data cells are controlled by a central node different than the macro cell with ideal backhaul. In this way, medium to high UE speeds can be supported, since cell selection and handovers can be performed much faster.

Since the number of independent CSI-RS available is limited and may be smaller than the number of small data cell deployed per macro cell, the proposed cell selection and handover mechanism may be complemented with a method, centralized and/or distributed, able to efficiently reuse CSI-RS across the network such as to mitigate confusion and collision problems.

The above-described cell selection and handover procedures are tailored to and allow operation of split control-plane and user-plane networks, which in turn facilitate network deployment, significantly mitigates radio link and handover failures, avoids PCI collision and confusion problems and provide significant power savings.

The present inventions may be embodied in other specific apparatus and/or methods. The described embodiments are to be considered in all respects as only illustrative and not restrictive. In particular, the scope of the invention is indicated by the appended claims rather than by the description and figures herein. All changes that come within the meaning and range of equivalency of the claims are to be embraced within their scope.

The invention claimed is:

1. A heterogeneous communications network, comprising:
 a macro cell;
 a small cell provided within the macro cell; and
 a user equipment provided within the macro cell, wherein the user equipment is operable to receive control-plane information from the macro cell and user-plane information from the macro cell and/or the small cell, and wherein frequency-time resources of a physical random access channel, PRACH, for the macro cell and the small cell are the same and are specified to the user equipment using the macro cell, wherein:
 the user equipment is operable to transmit a connection request based on the received control-plane information using the specified PRACH resources,
 the macro cell and the small cell are operable to determine which of the macro cell and the small cell is to operate as the serving cell for the user equipment based on the connection request, and
 the determined serving cell is operable to transmit a connection response to the user equipment.

2. The communications network according to claim 1, wherein the control-plane information indicates physical random access channel resources and random access preambles.

3. The communications network according to claim 1, wherein the user equipment is operable to identify the most appropriate cell to operate as the serving cell.

4. The communication network according to claim 3, wherein if the macro cell is identified to be the most appropriate cell to operate as the serving cell to be the macro cell, the connection request comprises a random access preamble.

5. The communication network according to claim 3, wherein if the small cell is identified to be the most appropriate cell to operate as the serving cell to be the small cell, the connection request comprises a modified random access preamble.

6. The communication network according to claim 5, wherein the network comprises a plurality of small cells each identified by individual CSI-RS signals.

7. The communications network according to claim 6, wherein the modified random access preamble or part of it is scrambled with the Gold code of the CSI-RS signal of the most appropriate small cell to operate as the serving cell.

8. The communications network according to claim 7, wherein only the small cell identified by the CSI-RS signal in the modified random access preamble is operable to decode the modified random access preamble and upon decoding the modified random access preamble that small cell is determined to be the serving cell of the user equipment.

9. A macro cell in a heterogeneous communications network, the heterogeneous communications network comprising a small cell provided within the macro cell and a user equipment provided within the macro cell, the user equipment being operable to receive control-plane information from the macro cell and user-plane information from the macro cell and/or the small cell, wherein frequency-time resources of a physical random access channel, PRACH, for the macro cell and the small cell are the same, wherein the macro cell is operable to:
- transmit control plane information to the user equipment including specified PRACH resources;
- receive a connection request from the user equipment using specified PRACH resources;
- determine which of the macro cell and the small cell is to operate as the serving cell for the user equipment based on the connection request; and
- if it is determined that the macro cell is to operate as the serving cell for the user equipment, transmit a connection response to the user equipment.

10. A small cell in a heterogeneous communications network, the heterogeneous communications network comprising a macro cell and a user equipment provided within the macro cell, the user equipment being operable to receive control-plane information from the macro cell and user-plane information from the macro cell and/or the small cell, wherein frequency-time resources of a physical random access channel, PRACH, for the macro cell and the small cell are the same, wherein the small cell is operable to:
- receive a connection request from the user equipment using the specified PRACH resources;
- determine which of the small cell and the macro cell is to operate as the serving cell for the user equipment based on the connection request; and
- if it is determined that the small cell is to operate as the serving cell for the user equipment, transmit a connection response to the user equipment.

11. A user equipment in a heterogeneous communications network, the heterogeneous communications network comprising a macro cell and small cell provided within the macro cell, wherein the user equipment is provided within the macro cell and is operable to receive control-plane information from the macro cell and user-plane information from the macro cell and/or the small cell, wherein frequency-time resources of a physical random access channel, PRACH, for the macro cell and the small cell are the same, and wherein the user equipment is operable to:
- receive control-plane information from the macro cell including specified PRACH resources;
- transmit a connection request based on the received control-plane information using the specified PRACH resources; and
- receive a connection response from either the macro cell or small cell that is determined to be the serving cell for the user equipment based on the connection request.

12. The user equipment as claimed in claim 11, wherein the user equipment is being served by either the macro cell or the small cell as a serving cell, wherein the user equipment is operable to periodically check a handover condition using measurements from the serving cell and neighbouring cells and transmit a measurement report to the serving cell indicating that a better serving cell is present, and
- receive an RRCConnection Reconfiguration delta message from the serving cell in which only the changes between the serving cell and the better serving cell are indicated.

13. A communications method for a heterogeneous communications network, the heterogeneous communications network comprising a macro cell, a small cell provided within the macro cell and a user equipment provided within the macro cell, the user equipment being operable to receive control-plane information from the macro cell and user-plane information from the macro cell and/or the small cell, wherein frequency-time resources of a physical random access channel, PRACH, for the macro cell and the small cell are the same, the method comprising:
- receiving control-plane information including specified PRACH resources from the macro cell at the user equipment;
- transmitting a connection request based on the received control-plane information from the user equipment using the specified PRACH resources;
- determining which of the macro cell and the small cell is to operate as the serving cell for the user equipment based on the connection request; and
- transmitting a connection response to the user equipment from the determined serving cell.

14. The communications method as claimed in claim 13, wherein the user equipment is being served by either the macro cell or the small cell as a serving cell, the method further comprising:
- checking a handover condition using measurements of the serving cell and neighbouring cells;
- transmitting a measurement report to the serving cell indicating that a better serving cell is present; and
- performing a handover to the better serving cell by transmitting an RRCConnection Reconfiguration delta message to the user equipment in which only the changes between the serving cell and the better serving cell are indicated.

15. A computer program product, comprising a computer usable medium having computer readable program code embodied therein, said computer readable program code adapted to be executed to implement a method as claimed in claim 13.

* * * * *